United States Patent [19]

Hanson

[11] Patent Number: 4,831,511
[45] Date of Patent: May 16, 1989

[54] MICROCOMPUTER IMPLEMENTED CONTROL DEVICE WITH MAINTENANCE PROVISIONS

[75] Inventor: Mark E. Hanson, Cary, N.C.

[73] Assignee: Northern Telecom Limited, Montreal, Canada

[21] Appl. No.: 903,233

[22] Filed: Sep. 3, 1986

[51] Int. Cl.⁴ .................... G05B 9/02; G06F 11/00
[52] U.S. Cl. .................... 364/184; 324/73 R; 371/17; 371/29
[58] Field of Search .................... 364/184, 185, 186; 371/15, 16, 17, 25, 29, 72; 324/73 R; 307/241, 242; 328/152

[56] References Cited

U.S. PATENT DOCUMENTS

| | | | |
|---|---|---|---|
| 3,659,273 | 4/1972 | Knauft et al. | 371/17 |
| 3,711,690 | 1/1978 | Osborne | 371/17 |
| 3,909,802 | 9/1975 | Cassarino, Jr. et al. | 371/17 |
| 4,048,672 | 9/1977 | Seiden et al. | 364/200 |
| 4,499,580 | 2/1985 | Takahashi et al. | 371/17 |
| 4,554,662 | 11/1985 | Suzuki et al. | 371/29 |
| 4,571,504 | 2/1986 | Iwamoto et al. | 307/242 |
| 4,625,311 | 11/1986 | Fitzpatrick et al. | 371/15 |

OTHER PUBLICATIONS

"Electronic Circuits", C. A. Holt, pp. 271–275, 524–527.

Primary Examiner—Joseph Ruggiero
Attorney, Agent, or Firm—Foley & Lardner, Schwartz, Jeffery, Schwaab, Mack, Blumenthal & Evans

[57] ABSTRACT

A microcomputer implemented control device having maintenance provisions. Indicators (such as light emitting diodes) are provided on the inputs and the outputs of the microcomputer along with switches to override the normal input or output. As a result, both the inputs and the outputs can be "forced" to a given state to be able to differentiate between a failure in ancillary equipment and a failure in the microcomputer itself.

13 Claims, 1 Drawing Sheet

MICROCOMPUTER IMPLEMENTED CONTROL DEVICE WITH MAINTENANCE PROVISIONS

This invention relates generally to control devices, and more particularly to a microcomputer implemented control device.

BACKGROUND OF THE INVENTION

Many microcomputers for controlling industrial processes are known. The model MC68705U3 microcomputer by Motorola is but one known device.

One aspect of a microcomputer used to control an industrial process (sometimes referred to as an automation processor) that is often overlooked, is that of long term maintenance.

SUMMARY OF THE INVENTION

The present invention is directed to addressing the aspect of maintenance. To accomplish this the present invention provides indicators (such as Light Emitting Diodes, LEDs) on both the inputs and the outputs of the microcomputer, along with switches to override the normal input or output. As a result, both the inputs and the outputs can be "forced" to a given state to be able to differentiate between a failure in the ancillary equipment and a failure in the microcomputer itself.

Stated in other terms, the present invention is a control device for controlling the operation of equipment, the control device characterized by: a microcomputer responsive to a plurality of input means; a plurality of output means responsive to the microcomputer; and switch means associated with either the input means or the output means for selectively forcing the condition of the input or output means to a predetermined state.

Stated in yet other terms, the present invention is a control device for controlling the operation of equipment, the control device characterized by: a microcomputer responsive to a plurality of input means; a plurality of output means responsive to the microcomputer; and switch means associated with both the input means and the output means for selectively forcing the condition of the input and output means to a predetermined state.

BRIEF DESCRIPTION OF THE DRAWINGS

The invention will now be described in more detail with reference to the accompanying drawing wherein.

DETAILED DESCRIPTION

Figure 1:
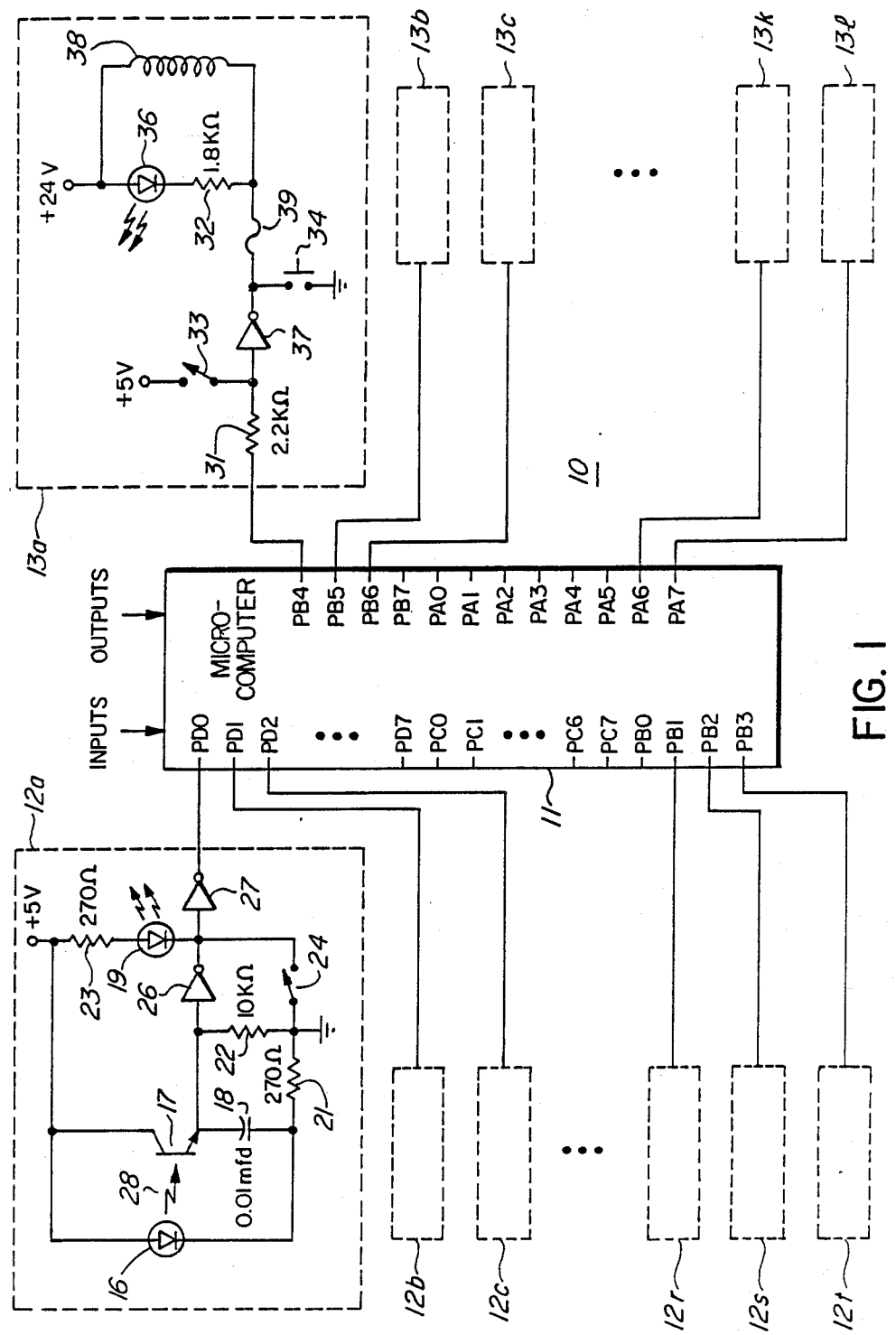
FIG. 1 is a simplified schematic drawing of one embodiment of the present invention.

FIG. 1 is a simplified schematic diagram depicting one preferred embodiment of the present invention. The circuit of Figure 1 is an automation processor referenced generally by the reference character 10.

Automation processor 10 is comprised of microcomputer 11 (a Motorola 68705U3), twenty input circuits 12a to 12t (referred to collectively as input circuits 12) and twelve output circuits 13a to 13l (referred to collectively as output circuits 13), all connected to microcomputer 11 as depicted in FIG. 1.

Each input circuit 12 is comprised of a light emitting diode (LED) 16, a phototransistor 17, capacitor 18, LED 19, resistors 21, 22, and 23, switch 24 and buffers 26 and 27, all interconnected as shown in FIG. 1, to which attention is directed. Buffers 26 have input Darlington drivers that are used as buffers to the next stage and to drive LEDs 19. Buffers 27 are inverter Schmidt triggers. Buffers 27 are used to square up the signal and to provide the necessary hysterisis to reduce false triggering under marginal conditions. Since the input signal (from transistor 17) is inverted twice, it is back to its original logic state when applied to microcomputer 11. Note that the light beam 28 between LED 16 and transistor 17 is blocked or not blocked (or reflected or not reflected) by equipment not shown, and it is this signal to which microcomputer 11 is responsive.

Switches 24 are used for checking the inputs to microcomputer 11. That is, the input to microcomputer 11 can be forced to the logic 1 state by closing switch 24; this applies ground (logic 0) to the input of buffer 27 which in turn inverts that signal and outputs a logic 1. When switch 24 is closed, LED 19 lights to indicate that the switch has been closed.

Each output circuit 13 is comprised of resistors 31 and 32, switches 33 and 34, LED 36, buffer 37, coil 38, and fuse 39, all interconnected as shown in FIG. 1, to which attention is directed. The output current of buffer 37 is rated at 1.5 amperes (at 30 volts) but is fused for 1.0 amperes by fuse 39.

Switch 33 is a single pole single throw toggle switch which applies +5 volts (logic 1) to buffer 37 when it is closed. Switch 34 is a momentary pushbutton switch that applies ground (logic 0) when closed. When switch 34 is closed, LED 36 lights, and coil 38 (part of a solenoid) is energized.

This arrangement allows the operation of the solenoid (via its coil 38), buffer 37, and microcomputer 11 to be checked via switches 33 and 34. If the solenoid does not operate with switch 34 closed, then the solenoid or fuse 39 are most likely defective. If the solenoid operates with switch 34 closed, but does not operate with switch 33 closed, then buffer 37 is most likely defective. And if the solenoid does not operate under direct control of microcomputer 11 (and all the inputs to microcomputer 11 are operating properly) but does operate when switch 33 is closed, then microcomputer 11 is most likely at fault.

The parts used in FIG. 1 are as follows:

Microcomputer 11 ----- Motorola 68705U3
LED 16 ---------- GE 446
Phototransistor 17 ---- GE LI4G1
Buffer 26 -------- ULN2003A
Buffer 27 -------- 74LS14
LED 19 ---------- XC556G
Buffer 37 -------- ULN2068B
LED 36 ---------- XC556Y
Solenoid 38 ------- Generic (6 watt)

Microcomputer 11 is clocked by a clock signal of 3.579 megahertz (colour burst). Note that for different applications, the ratio of inputs to outputs of microcomputer 11 can be changed. Note also that instead of input circuit 12, different types of input circuits can be used (e.g. RS-232 data, etc.). Additionally, output devices 13 can drive motors, etc. instead of solenoids; and RS-232 devices etc. can also be driven with suitable changes to the output voltage levels.

Inputs can be reprogrammed as outputs to drive at 5 volt logic levels an MC1488 RS-232 line driver for serial data transmission. RS-232 serial data may be received directly through an input via a 1N148 diode.

What is claimed is:

1. A microcomputer implemented control device with maintenance provisions for automatic process control in a manufacturing operation, said control device comprising:
- a microcomputer responsive to a plurality of input means;
- a plurality of output means responsive to said microcomputer;
- first and second switch means associated with said output means for selectively forcing a condition of said output means to a predetermined state; and
- a third switch means associated with said input means for selectively forcing a condition of said input means to a predetermined state.

2. The control device of claim 1 wherein an indicator device is associated with each of said input and said output means for displaying the respective predetermined states.

3. The control device of claim 1 wherein said output means includes fuse means for output protection of shorted loads.

4. The control device of claim 1 wherein an indicator means is associated with each of said input and said output means for displaying the respective predetermined states.

5. The control device of claim 1 wherein said input means includes buffer means for reducing false triggering of said microcomputer.

6. The control device of claim 1 wherein said buffer means comprises inverter Schmidt triggers.

7. A control device for automating a manufacturing operation, said control device comprising:
- a plurality of input means, each including a first switching means connected in series to buffer means for passing an input signal and a second switching means for selectively forcing a condition of said input means to a predetermined state;
- a microcomputer responsive to said plurality of input means;
- a plurality of output means responsive to said microcomputer
- each said output means including third and fourth switching means for selectively forcing a condition of said output means to a predetermined state.

8. The control device of claim 7 wherein said output means includes fuse means for output protection of shorted loads.

9. The control device of claim 7 wherein an indicator means is associated with each of said input and said output means for displaying the respective predetermined states.

10. The control device of claim 9 wherein said indicator means is a light emitting diode.

11. The control device of claim 7 wherein said buffer means comprises first and second buffer circuits.

12. The control device of claim 11 wherein said first buffer circuit comprises input Darlington drivers.

13. The control device of claim 11 wherein said second buffer circuit comprises inverter Schmidt triggers.

* * * * *